Figure 1:
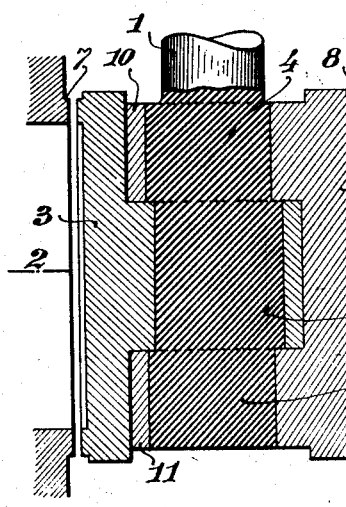

Aug. 18, 1925.

A. BÖTTNER 1,550,338

GATE VALVE

Filed Jan. 29, 1925

Inventor:
Arno Böttner

Patented Aug. 18, 1925.

1,550,338

UNITED STATES PATENT OFFICE.

ARNO BÖTTNER, OF SUDENBURG, NEAR MAGDEBURG, GERMANY, ASSIGNOR TO THE FIRM POLTE, OF MAGDEBURG, GERMANY.

GATE VALVE.

Application filed January 29, 1925. Serial No. 5,583.

*To all whom it may concern:*

Be it known that I, ARNO BÖTTNER, a citizen of the German Republic, residing at Sudenburg, near Magdeburg, Germany, have invented certain new and useful Improvements in Gate Valves, of which the following is a specification.

My invention relates to an improved parallel slide stop valve or gate valve for use in steam conduits and comprising two parallel cut-off plates.

According to the invention I provide at the lower end of the valve stem intermediate between the said two parallel plates, co-operating bodies of cylindrical cross-section which are firmly connected or integral with the actuating spindle or stem so as to project eccentrically therefrom and which, on the other hand, are located in parts of the plates so as to be enclosed therein from all sides and to act to withdraw the plates from the co-operating shutting faces or seals of the valve if the spindle or stem is turned in the opening or anticlockwise direction.

Obviously the movement of the plates in the closing direction is less important than the opening movement thereof for when the valve is closed the pressure of the steam acting on the one side or plate ensures a light closure without the necessity of applying any supplemental mechanical means for the purpose. On the other hand, however, the withdrawal of the plates from their seats, in case of opening the valve, is of utmost importance particularly if the valve had remained in a closed state for a comparatively great length of time. For in such cases the cooperating sealing faces frequency stick together owing to the uninterrupted action of the heat so that it sometimes will be very difficult to open the valve.

The object of my invention is to provide means for remedying this defect and to this end the shutting plates are withdrawn, according to my invention, with great power from their seats or cooperating faces owing to the eccentrical action of the cylindrical bodies or enlargements I provide on the spindle or stem, so that the steam will be free to pass through the valve whereby the plates are relieved from steam pressure momentarily and the further opening of the valve can be brought about by a continued rotation of the spindle or stem in a comparatively easy manner.

I am aware of the fact that in gate valves, particularly of the larger type, means have been suggested heretofore for a similar purpose, providing a small tube in connection with the valve casing, said tube having a controlling valve and connecting the two spaces before and past the gate valve so that, by opening the small valve, a small amount of steam will be allowed to pass from the one side to the other side of the gate valve in order to produce a pressure balance on both sides prior to the opening of the gate valve. In this way, the latter can be opened with greater ease since the shutting plates of the gate valve are not forced towards the seat through steam pressure acting on the one side which would occur if a pressure balance were not brought about previous to the opening of the gate valve. Instead of the complicated by-way in the form of a supplemental valve-controlled connecting tube, as heretofore, I provide, according to my invention, a more efficient and simple means by which the shutting plates are positively withdrawn from their seats by eccentric cylindrical bodies or enlargements on the spindle or stem as soon as the latter is actuated to open the valve and vice versa.

In the drawings forming a part of the specification I have shown, by way of example, a preferred embodiment of the invention, it being understood that for simplicity's sake only the shutting plates, the part of the valve casing constituting the seats for the plates and the bottom end of the spindle or stem with the improved means for controlling the plates, as above indicated, are illustrated. For the gate valve as a whole or respecting the other constituents thereof which are not depicted, may be of any suitable or conventional shape and construction known to persons versed in the art so that it seems unnecessary to also illustrate and describe the same in detail, it being evident that the spindle or stem is adapted to rise and to descend if actuated in the usual manner by means of a handwheel commonly provided at the top of the spindle or stem, in the one or the other direction, in order to move the shutting plates.

Figure 2:
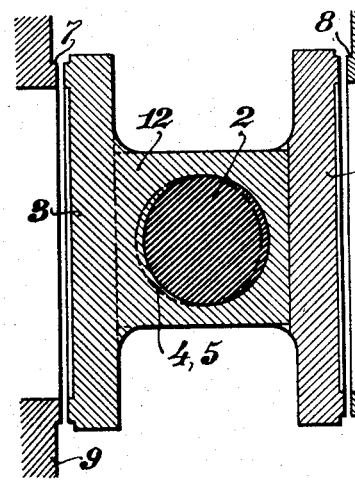

In the drawings Figure 1 is a vertical section of the parts of the gate valve above mentioned; Figure 2 is a horizontal section thereof taken on the line II—II of the Figure 1, the two figures showing the movable parts in the withdrawn position, whilst Figure 3 is a central vertical section similar to Figure 1 and Figure 4 is a horizontal section taken on the line IV—IV of Figure 3, the two figures showing the movable parts in the closing position.

Referring to the construction shown the bottom end of the spindle or stem 1 is located midway between the two shutting plates 3 and 6 and carries three cylindrical bodies 2, 4 and 5 of eccentrical arrangement or, in other words, is shaped to form three eccentrical enlargements of cylindrical contour snugly fitting in vertical bores of lateral projections or lugs of the two shutting plates, the enlargements 4 and 5 engaging in the bottom projections or lugs 10 and 11 of the plate 6 in order to control the latter, and the intermediate enlargement 2 engaging in the projection or lug 12 of the plate 3 in order to control the same. It will be seen that the lug 12 is enclosed between the two lugs 10 and 11 and capable of sliding therebetween to a small amount depending upon the eccentricity of the said enlargements on the spindle or stem 1, and further that the enlargement or body 2 is displaced 180° with relation to the enlargements or bodies 4 and 5 so that the eccentrical action or the movement of the two plates 3 and 6 will take place in opposite directions each time the spindle or stem is turned for opening or for closing purpose.

Figure 3:
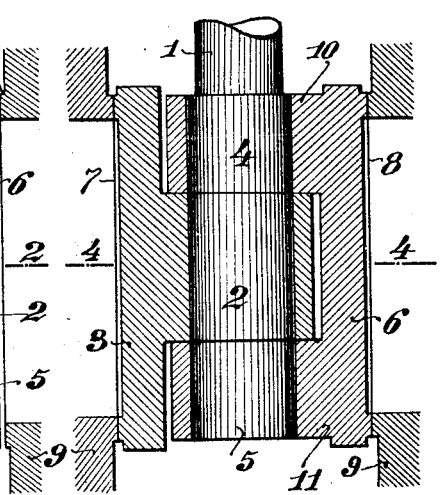
Figure 4:
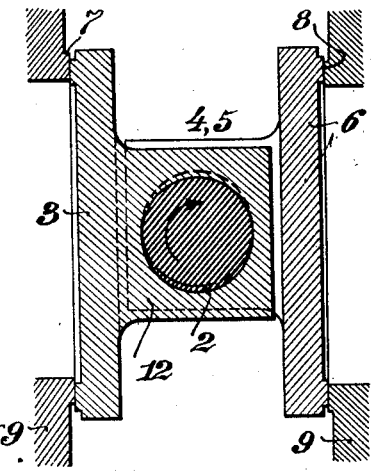

As soon as, in case of closing the valve, the two plates 3 and 6 have been screwed down in the manner usual in valves of this type, so as to be in the position of axial alinement with the axis of the conduit or of the casing 9, the downward movement of the spindle or stem 1 changes into a rotary movement whereby the eccentrical bodies or enlargements 2, 4 and 5 are caused to radially move the two plates 3 and 6 from the position shown in Figure 1 to the position shown in Figure 3 with the closing faces of the plates forced tightly upon the cooperating faces 7 and 8 of the corresponding seats, as will be readily understood from an inspection of the two figures.

In case of opening the valve the operations are in the reverse order, that is to say, the spindle or stem together with the eccentrical enlargements 2, 4 and 5 first rotate so that the two plates 3 and 6 are returned from the position illustrated in Figure 3 to the position shown in Figure 1. As soon as the latter position is reached, the spindle or stem 1 will, upon continued rotation of its hand-wheel, move axially upwards without turning, whereby the two plates are removed from the conduit or the casing portion 9 up to an elevated position so that the valve will be open and the steam can flow through the full of the sectional area of the valve way.

Figures 1 and 2 illustrate the position of the shutting plates 3 and 6 before the short rotary movement of the spindle, the plates being out of contact with the cooperating faces 7 and 8 forming the seats properly speaking of the valve; in Figures 3 and 4 however, the spindle or stem 1 has been turned in the direction of the arrow in Figure 3 for 90°, the plates being in intimate contact with the faces 7 and 8 of the casing so that the valve is fully closed.

The shutting plates 3 and 6 are constructed and disposed in a manner that they cannot, if retracted as shown in Figures 2 and 4, come in contact with the seats or faces 7 and 8 of the casing, no matter how great the pressure of the steam in the conduit may be, so that there never will be any frictional touch between the plates 3 and 6 and the cooperating faces 7 and 8 of the casing, and the closing faces of the plates and of the seats will not be liable to be worn off or damaged to any considerable degree by frictional contact which is the main advantage of my improved gate valve over the state of the art.

A further advantage resides in the simplicity and efficiency of the described new construction as compared with the gate valves of this type hitherto suggested and in which levers, joints, bolts, springs and similar means are applied which are entirely dispensed with in my improved construction. A still further advantage lies in the possibility of replacing the eccentrical bodies on the spindle or stem in case that the closing faces of the plates or of the casing require any occasional grinding and polishing. In such an event operating bodies of a somewhat greater eccentricity may be readily affixed to the spindle or stem in lieu of the ones that had before been in use.

From the foregoing it is believed that the advantages and novel features of my invention will be readily understood and, therefore, further detailed description is deemed unnecessary.

In reducing my invention to practice I find that the form referred to herein as a preferred embodiment is most efficient but realizing that certain conditions will necessarily vary in concurrence with the adoption of my valve I desire to emphasize that fact that not only the eccentrical enlargements of the spindle but also various minor changes in the details of constructions and in the proportion of parts may be resorted to when required or desired, without sacrificing any of the advantages of my invention as defined in the appended claims.

What I claim is:—

1. A device for operating a valve comprising a casing; a pair of shutting plates in said casing each provided with a lateral projection; and a spindle having a pair of eccentrics thereon, each adapted to operate one of said shutting plates by means of its lateral projection in order to impart a lateral movement to said plates when said spindle is actuated.

2. A device for operating a valve comprising a casing; a pair of shutting plates in said casing, one of said plates having two lateral projections and the other having a single lateral projection adapted to project between the two lateral projections; and a spindle having three eccentrics thereon, two end eccentrics cooperating with the two lateral projections of one plate and a central eccentric cooperating with the single projection of the other plate in order to impart a lateral movement to said plates when said spindle is actuated.

In testimony whereof I affix my signature.

ARNO BÖTTNER.